United States Patent [19]
Conigliaro, Jr.

[11] Patent Number: 4,907,365
[45] Date of Patent: Mar. 13, 1990

[54] ELECTROCUTING GRID FOR AN ELECTRONIC INSECT TRAP, AND METHOD OF FABRICATING SAME

[75] Inventor: Anthony Conigliaro, Jr., Sherborn, Mass.

[73] Assignee: Armatron International, Inc., Melrose, Mass.

[21] Appl. No.: 270,424

[22] Filed: Nov. 9, 1988

Related U.S. Application Data

[62] Division of Ser. No. 147,709, Jan. 25, 1988, abandoned.

[51] Int. Cl.$^4$ .............................................. A01M 1/22
[52] U.S. Cl. ...................................... 43/112; 29/610.1
[58] Field of Search ............... 43/98, 112; 219/532, 219/545, 548; 29/610.1, 611, 868, 871, 412, 413, 418

[56] References Cited

U.S. PATENT DOCUMENTS

| | | | |
|---|---|---|---|
| 1,962,420 | 6/1934 | Bradley | 43/112 |
| 3,464,144 | 9/1969 | Kannett | 43/112 |
| 3,789,537 | 2/1974 | Rule et al. | 43/112 |
| 4,158,268 | 6/1979 | DeYoreo | 43/112 |
| 4,603,505 | 8/1986 | Millard | 43/112 |

*Primary Examiner*—Kurt Rowan
*Attorney, Agent, or Firm*—Samuels, Gauthier, Stevens & Kehoe

[57] ABSTRACT

An electrocuting grid for an electronic insect trap, wherein first and second circular electrically conductive carrier members are arranged concentrically in an axially spaced relationship to define a cylindrical zone therebetween. First and second electrodes respectively extend laterally from the first and second carrier members into the cylindrical zone. The first and second electrodes are arranged circumferentially in a mutually spaced alternating sequence, with their ends spaced respectively from the second and first carrier members. Dielectric strand material interconnects the first and second electrodes. The invention also encompasses a method for fabricating the electrocuting grid which includes a plurality of steps performed on a strip of electrically conductive sheet material.

4 Claims, 3 Drawing Sheets

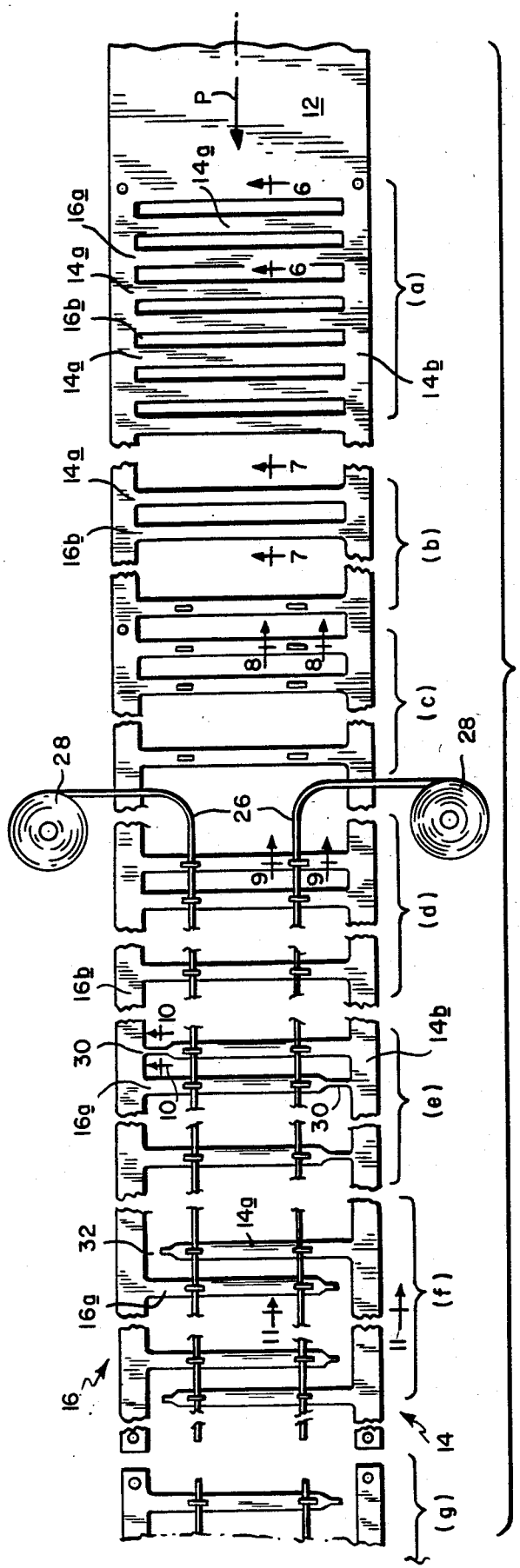
FIG.5
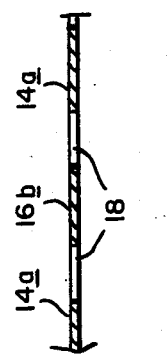
FIG.6
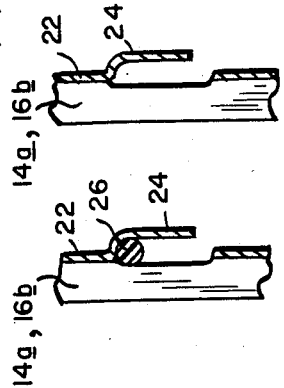
FIG.7
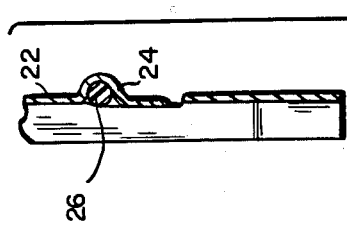
FIG.8  FIG.9
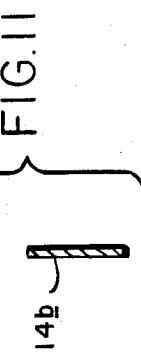
FIG.10
FIG.11

ELECTROCUTING GRID FOR AN ELECTRONIC INSECT TRAP, AND METHOD OF FABRICATING SAME

This is a divisional of application Ser. No. 147,709 filed on Jan. 25, 1988, now abandoned.

BACKGROUND OF THE INVENTION

1. Field of the Invention

This invention relates to electronic insect traps, and is concerned in particular with an improved electrocuting grid for use in such traps, as well as with the method of fabricating the grid.

2. Description of the Prior Art

Although the art of designing and fabricating electrocuting grids for electronic insect traps is now fairly well developed, certain problems still remain. For example, and with reference to U. S. Pat. No. 4,158,268, it is known to provide a grid or grill assembly wherein first and second electrodes are supported respectively between first and second pairs of circular carrier members. The first carrier members have smaller diameters than the second carrier members and are arranged concentrically within the second carrier members, with dielectric spacers radially interposed therebetween. The use of different diameter pairs of carrier members for each set of electrodes adds unnecessarily to the overall bulk, weight and cost of the unit. Cost is further increased by the time and labor required to assemble the various components.

Other examples of known assemblies which have the same or similar problems associated therewith are disclosed in U.S. Pat. Nos. 3,823,506; 2,106,528; 2,092,136; 2,061,458; 1,985,921; Re. 18,313; 1,936,468; and Re. 18,294.

SUMMARY OF THE PRESENT INVENTION

An object of the present invention is the provision of a grid wherein the first and second electrodes are each respectively supported by single first and second circular carrier members, with the first and second carrier members having the same diameter.

Another object of the present invention is the provision of a grid wherein first and second subassemblies each consisting of circular carrier members with electrodes extending laterally therefrom, are held together in a mutually spaced cylindrical configuration by dielectric strands encircling and mechanically engaged to the electrodes. A companion objective includes the provision of integral tangs on the electrodes which are clinched onto the encircling dielectric strands to effect the required mechanical engagement.

These and other objects, features and advantages of the present invention will become more apparent as the description proceeds with reference to the accompanying drawings.

BRIEF DESCRIPTION OF THE DRAWINGS

FIG. 5 is a diagrammatic illustration of the method of fabricating the grid unit; and FIGS. 6, 7, 8, 9, 10 and 11 are sectional views taken respectively on lines 6—6, 7—7, 8—8, 9—9, 10—10 and 11 of FIG. 5.

DETAILED DESCRIPTION OF THE INVENTION

Figure 1:
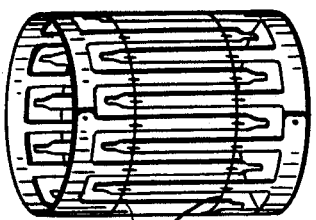
FIG. 1 is a perspective view of an electrocuting grid in accordance with the present invention.

With reference initially to FIG. 1, a grid in accordance with the present invention is generally depicted at 10. The method of fabricating the grid will first be described with references to FIGS. 5-10. Fabrication begins with a strip 12 of electrically conductive material, typically sheet steel of a relatively thin gauge on the order of 0.0179″. At station (a), the strips initially blanked to produced an alternating series of laterally extending longitudinally spaced electrodes 14a,16a which extend between and are integrally joined at their opposite ends to first and second carrier members 14b,16b. The carrier members extend along the side edges of the strip. As can be best seen in FIG. 6, the electrodes 14a,16a initially have flat cross sections, with spaces 18 therebetween.

At station (b), the flat electrodes 14a,16a are deformed by stamping into U-shaped cross-sectional configurations. As shown in FIG. 7, the U-shaped configurations are defined by side flanges 20 interconnected by web portions 22.

At station (c), the web portions 22 of the electrodes 14a,16a are lanced to produce integrally formed tangs 24. One such tang is illustrated on a larger scale in FIG. 8. Preferably, at least two series of tangs 24 are provided, each extending in the direction of the length of the strip 12 in parallel relationship to the carrier members 14b,16b.

At station (d), dielectric strands 26 are inserted beneath the tangs 24. The strands 26 are unwound from rolls 28, and typically comprises 0.062″ Teflon. FIG. 9 illustrates the initial insertion of the strands 26 beneath the tangs 24.

At station (e), the ends of the electrodes 14a are crimped as at 30 adjacent to their juncture to carrier member 16b, and the electrodes 16a are likewise crimped at 30 adjacent to their juncture to carrier member 14b. As illustrated in FIG. 10, the crimping at 30 brings the side flanges 20 together.

At station (f), the tangs 24 are clinched onto the dielectric strands 26, as shown in FIG. 11, and the crimped electrode ends are severed as at 32. At this stage, the first and second carrier members 14b,16b and their respective first and second electrodes 14a,16a now comprise separate subassemblies 14,16 which are interconnected and held together in a unitary longitudinally extending assembly by the dielectric strands 26.

Figure 4:
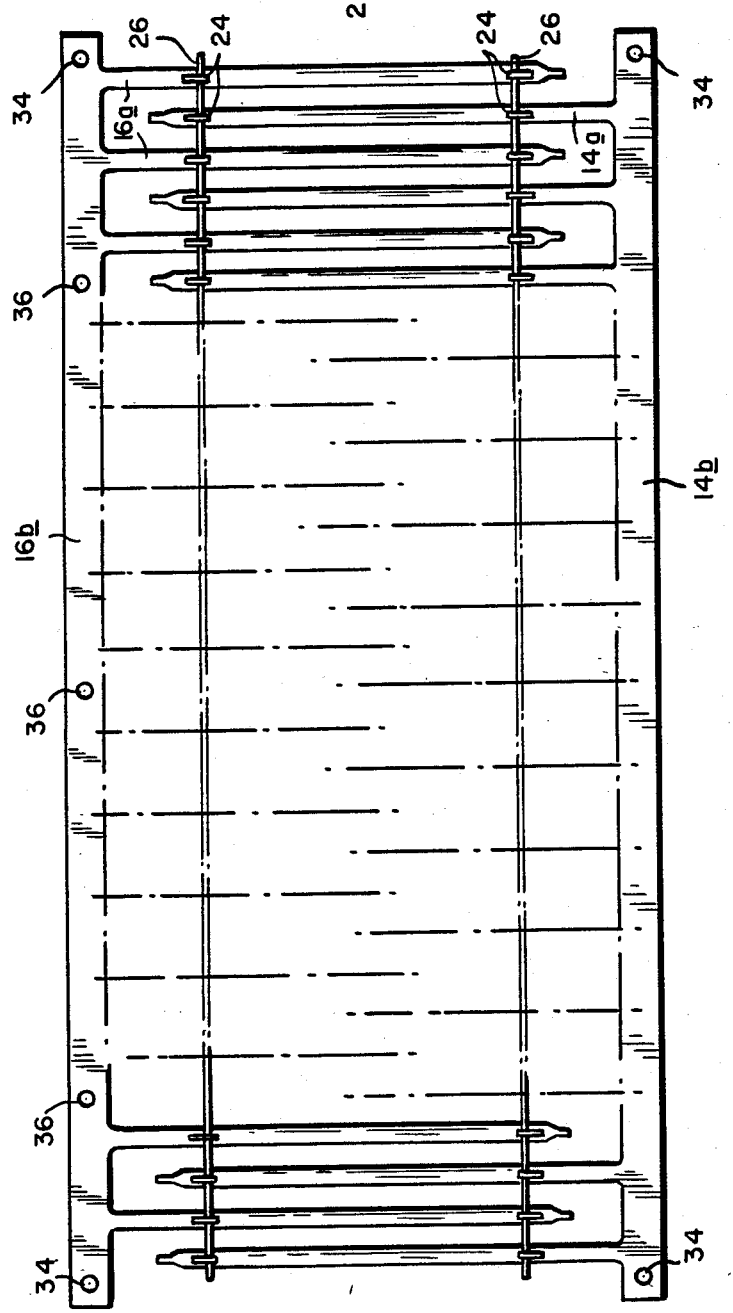
FIG. 4 is a plan view of a grid unit prior to its being shaped into the finished cylindrical configuration.

At station (g), the carrier members 14b,16b and the dielectric strands 26 are severed at appropriate intervals to subdivide the unitary assembly into individual flat grid units, one of which is illustrated on an enlarged scale in FIG. 4. The carrier members 14b,16b of each unit have holes 34 at their ends, and at least one of the carrier members 16b is provided with additional holes 36 intermediate its ends. The holes 34,36 may be drilled or punched at station (f). Preferably, however, the holes 34,36 will be drilled or punched into the strip 12 in advance of station (a), and will thus provide a means of locating and registering the strip as it is moved longitudinally along path P, with stations (a) to (g) being located along the path, and with the operations at each successive station being performed sequentially on the moving strip.

Figure 3:
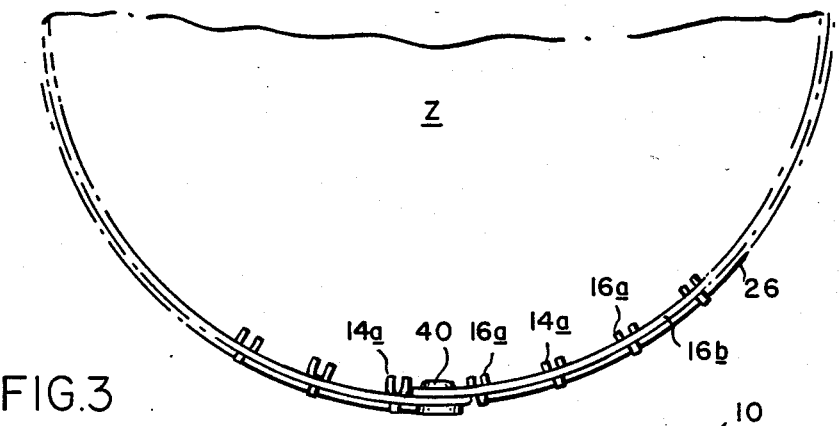
FIG. 3 is a partial top plan view of the grid.
Figure 2:
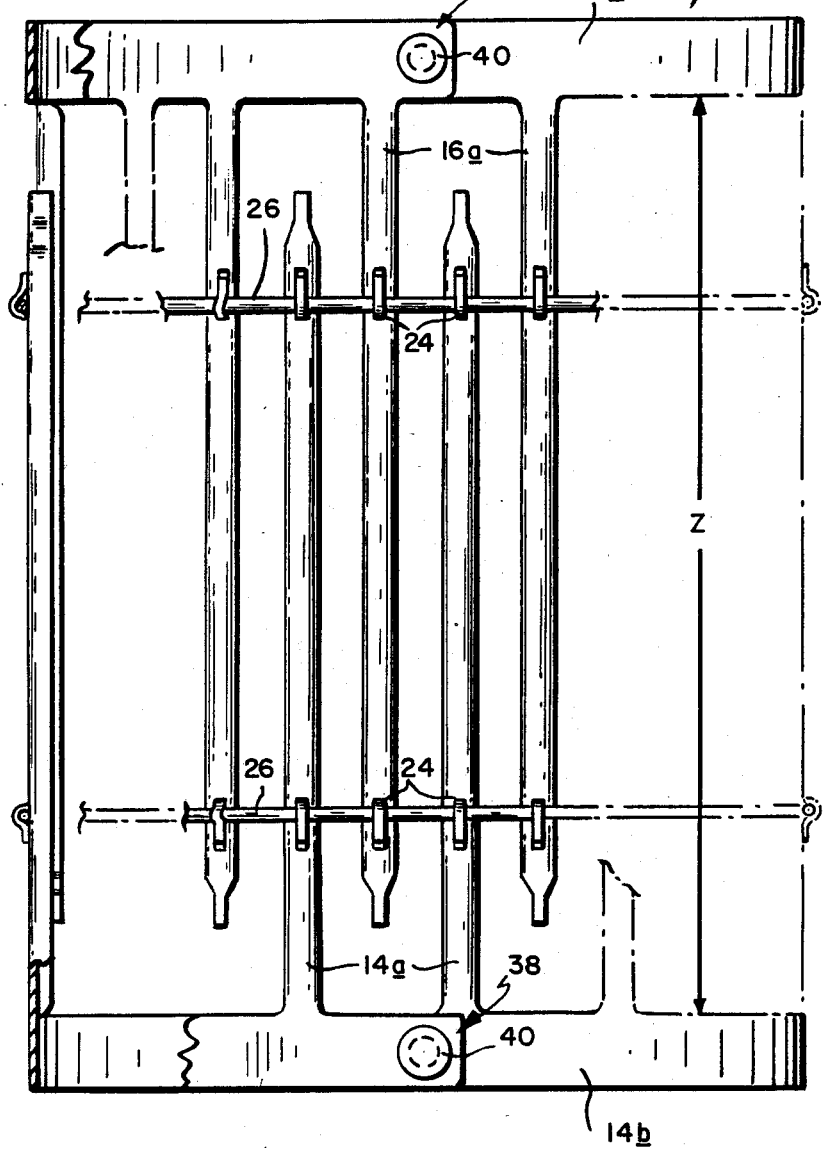
FIG. 2 is a side elevational view of the grid on a greatly enlarged scale.

The final fabrication step entails shaping the individual unit of FIG. 4 into the cylindrical grid illustrated in FIGS. 1-3. When thus shaped, the first and second carrier members 14b,16b are circular and of equal diameter, with their ends overlapped as at 38 and interconnected by fasteners 40 extending through the holes 34. The circular carrier members are arranged concentrically in an axially aligned relationship to define a cylindrical zone Z therebetween.

The first and second electrodes 14a,16a are arranged circumferentially around the zone Z in a mutually spaced alternating sequence. The U-shaped cross sections of the electrodes 14a,16a open inwardly towards the interior of the zone Z. The electrodes are encircled by the dielectric strands 26 which are clinched in placed by the bendable tangs 24.

In light of the foregoing, it will now be appreciated by those skilled in the art that the grid of the present invention, and its method of fabrication, offer a number of important advantages as compared to the prior art grids and their methods of fabrication and assembly. For example, the first and second electrodes 14a,16a are supported respectively by single first and second carrier members 14b,16b, thereby contributing to a lightweight low cost structure. As shown in FIG. 3, the first and second electrodes and their respective carrier members lie on the same circle, thereby enabling electrocuted insects to drop more readily from the grid. The resulting streamlined silhouette is less bulky than that of the prior art grids, and is thus easier to manipulate during assembly into the insect traps.

The method of fabrication readily lends itself to a continuous automated operation, thereby further reducing costs. The positive clinching of the encircling dielectric strands 26 under the bendable tangs 24 insures that the first and second electrodes 14a,16a remain properly spaced one from the other, thereby avoiding arcing.

I claim:

1. A method of fabricating an electrocuting grid for an electronic insect trap, said method comprising the steps of:

blanking and deforming a strip of electrically conductive sheet material to produce an alternating series of mutually spaced first and second electrodes extending laterally between and integrally joined at their opposite ends to parallel first and second carrier members;

mechanically interconnecting said first and second electrodes to dieletric strand material extending in parallel relationship to said carrier members;

severing said first and second electrodes respectively from said second and first carrier members to thereby provide a unitary assembly made up of a first subassembly consisting of said first carrier member and said first electrodes interconnected by said dielectric strand material to a second subassembly consisting of said second carrier member and said second electrodes; and shaping said assembly into a cylindrical grid wherein said carrier members are circular, arranged concentrically, and axially spaced one from the other to define a cylindrical zone therebetween, and wherein said first and second electrodes respectively extend laterally from said first and second carrier members into said zone.

2. A method of fabricating an electrocuting grid for an electronic insect trap, said method comprising the steps of:

blanking a strip of electrically conductive sheet material to produce a series of longitudinally spaced laterally extending flat electrodes integrally joined at their opposite ends to first and second carrier members extending along the side edges of said strip;

deforming said flat electrodes into U-shaped cross-sectional configurations;

lancing said electrodes to produce integrally formed bendable tangs aligned in the direction of the length of said strip;

inserting dielectric strand material under said tangs;

clinching said tangs onto said strand material;

severing successive electrodes alternately from said first and second carrier members in order to produce an alternating sequence of first and second electrodes respectively integrally joined to and extending laterally from said first and second carrier members, with the distal ends of said first and second electrodes being spaced respectively from said second and first carrier members, and with the first electrodes and the first carrier member integrally joined thereto being mechanically interconnected to and electrically isolated from the second electrodes and the second carrier member integrally joined thereto by said dielectric strand material to thereby provide a unitary longitudinally extending assembly;

subdividing said assembly into discrete units; and shaping said units into cylindrical grids wherein said carrier members are circular, of the same diameter, arranged concentrically, and spaced axially one from the other to define a cylindrical zone therebetween, and wherein said first and second electrodes respectively extend laterally from said first and second carrier members into said zone.

3. The method of either claims 1 or 2 wherein all but the last of said steps is performed sequentially at successive locations along a path along which said strip is moved longitudinally.

4. The method of either claims 1 or 2 wherein prior to being severed, the distal ends of said electrodes are crimped to close their U-shaped configurations.

* * * * *